US012780559B2

(12) United States Patent
Chen et al.

(10) Patent No.: US 12,780,559 B2
(45) Date of Patent: Nov. 3, 2026

(54) METHOD FOR DETERMINING MATERIAL-CAGE STACKING, COMPUTER DEVICE, AND STORAGE MEDIUM

(71) Applicant: VisionNav Robotics USA Inc., Acworth, GA (US)

(72) Inventors: Peng Chen, Shenzhen (CN); Mu Fang, Shenzhen (CN); Yujie Lu, Shenzhen (CN); Bingchuan Yang, Shenzhen (CN)

(73) Assignee: VisionNav Robotics USA Inc., Acworth, GA (US)

(*) Notice: Subject to any disclaimer, the term of this patent is extended or adjusted under 35 U.S.C. 154(b) by 134 days.

(21) Appl. No.: 18/788,608

(22) Filed: Jul. 30, 2024

(65) Prior Publication Data

US 2024/0383695 A1 Nov. 21, 2024

Related U.S. Application Data

(63) Continuation of application No. 18/737,361, filed on Jun. 7, 2024, now Pat. No. 12,623,856, which is a (Continued)

(30) Foreign Application Priority Data

Jun. 10, 2021 (CN) ......................... 202110648779.8

(51) Int. Cl.
*B65G 43/08* (2006.01)
*B65G 57/20* (2006.01)

(52) U.S. Cl.
CPC ............. *B65G 43/08* (2013.01); *B65G 57/20* (2013.01); *B65G 2203/0233* (2013.01); *B65G 2203/041* (2013.01); *B65G 2814/0305* (2013.01)

(58) Field of Classification Search
CPC .................... B65G 43/08; B65G 57/20; B65G 2203/0233; B65G 2203/041;
(Continued)

(56) References Cited

U.S. PATENT DOCUMENTS 10,562,714 B2 * 2/2020 Hamaguchi ............ B65G 43/00
10,647,528 B1 * 5/2020 Diankov ................ B65G 47/90
(Continued)

FOREIGN PATENT DOCUMENTS

CN 110606305 A * 12/2019 ........... B65G 1/1373
CN 111553951 A * 8/2020 ............. G06V 20/64
(Continued)

OTHER PUBLICATIONS

IPSearch History Aug. 11, 2026 UTC; InnovationQ+; https://iq.ip.com/discover (Year: 2026).*
(Continued)

*Primary Examiner* — Gene O Crawford
*Assistant Examiner* — Abby A Jorgensen
(74) *Attorney, Agent, or Firm* — Getech Law LLC; Jun Ye

(57) ABSTRACT

A method for determining material-cage stacking, a computer device, and a storage medium are provided. The method includes the following. A material-cage image is obtained by photographing a first stacking apparatus of a first material cage and a second stacking apparatus of a second material cage. The stacking apparatuses of the two material cages in the material-cage image can be recognized respectively with two detection models. The first stacking result is obtained by obtaining location information of the stacking apparatuses of the two material cages with the first detection model, and the second stacking result is obtained with the second detection model.

20 Claims, 5 Drawing Sheets

Related U.S. Application Data continuation of application No. 17/832,951, filed on Jun. 6, 2022, now Pat. No. 12,084,290.

(58) Field of Classification Search

CPC .. B65G 2814/0305; B66F 9/0755; B66F 9/07; B66F 9/063; G06T 7/11; G06T 7/60; G06T 7/70; G06V 10/10

See application file for complete search history.

(56) References Cited

U.S. PATENT DOCUMENTS

| | | | | |
|---|---|---|---|---|
| 11,964,858 | B2 | 4/2024 | Kim et al. | |
| 2017/0334667 | A1* | 11/2017 | Schroeder | B65G 57/165 |
| 2019/0061151 | A1 | 2/2019 | Namiki | |
| 2021/0023717 | A1* | 1/2021 | Yu | B25J 19/023 |
| 2021/0053778 | A1* | 2/2021 | Morawietz | B65G 57/303 |
| 2021/0331869 | A1* | 10/2021 | Martin, Jr. | B65B 11/045 |

FOREIGN PATENT DOCUMENTS

| | | | | |
|---|---|---|---|---|
| CN | 111814936 | A | 10/2020 | |
| CN | 112327320 | A | 2/2021 | |
| CN | 112660686 | A * | 4/2021 | |
| CN | 114920034 | A * | 8/2022 | B65G 67/04 |
| DE | 102016013497 | A1 * | 5/2017 | B65G 61/00 |
| JP | 2017124877 | A * | 7/2017 | B65G 43/08 |
| JP | 2020040796 | A | 3/2020 | |
| KR | 20170073814 | A | 6/2017 | |

OTHER PUBLICATIONS

EP22177559.6—Extended European Search Report mailed on Oct. 27, 2022, 11 pages.

JP2022091950—Notice of Reasons for Refusal mailed on Apr. 10, 2023, 6 pages.

"Search History", InnovationQ+, IP.com and IEEE, UTC, Dec 10, 2025, 4 pages.

CN202110648779.8—First Office Action Mailed on Dec. 11, 2025, 9 pages.

U.S. Appl. No. 18/737,361—Notice of Allowance Mailed on Jan. 20, 2026, 9 pages.

* cited by examiner

METHOD FOR DETERMINING MATERIAL-CAGE STACKING, COMPUTER DEVICE, AND STORAGE MEDIUM

CROSS-REFERENCE TO RELATED APPLICATION

This application is a continuation application of U.S. application Ser. No. 18/737,361, filed on Jun. 7, 2024, which is a continuation application of U.S. application Ser. No. 17/832,951, filed on Jun. 6, 2022, which claims priority under 35 U.S.C. § 119(a) to Chinese Patent Application No. 202110648779.8, filed on Jun. 10, 2021, the contents of which are incorporated herein by reference in their entireties.

TECHNICAL FIELD

This disclosure relates to the technical field of warehousing and logistics, and in particular to a method for determining material-cage stacking, a computer device, and a storage medium.

BACKGROUND

With development of warehousing and logistics technology, goods are usually transported and stored with material cages during warehousing, and with material-cage stacking, it is possible to realize three-dimensional storage and reduce occupation for storage space.

In traditional warehousing scenarios, a driver needs to extend his head out of a forklift to check a status of material cages whenever the driver drives the forklift to stack the material cages, so as to determine whether the material cages can be stacked. However, every time the material cages need to be stacked, the driver needs to manually determine whether stacking is possible, which reduces efficiency of material-cage stacking.

SUMMARY

Based on the above, it is necessary to provide a method for determining material-cage stacking, a computer device, and a storage medium for the above technical problems.

A method for determining material-cage stacking is provided. The method includes the following. A material-cage image is obtained by photographing a first stacking apparatus of a first material cage and a second stacking apparatus of a second material cage. First target detection is performed on the material-cage image with a first detection model to recognize the first stacking apparatus of the first material cage and the second stacking apparatus of the second material cage. First location information of the first stacking apparatus and second location information of the second stacking apparatus are determined, and a first stacking result is determined based on the first location information and the second location information. Second target detection is performed on the material-cage image with a second detection model to extract feature information of the material-cage image, and a second stacking result is obtained based on the feature information. Whether the first material cage can be stacked on the second material cage is determined based on the first stacking result and the second stacking result.

A computer device is provided. The computer device includes a processor and a memory. The memory is configured to store computer instructions which, when executed by the processor, enable the processor to execute the following. A material-cage image is obtained by photographing a first stacking apparatus of a first material cage and a second stacking apparatus of a second material cage with an image obtaining device. First target detection is performed on the material-cage image with a first detection model to recognize the first stacking apparatus of the first material cage and the second stacking apparatus of the second material cage. First location information of the first stacking apparatus and second location information of the second stacking apparatus are determined, and a first stacking result is determined based on the first location information and the second location information. Second target detection is performed on the material-cage image with a second detection model to extract feature information of the material-cage image, and a second stacking result is obtained based on the feature information. Whether the first material cage can be stacked on the second material cage is determined based on the first stacking result and the second stacking result.

A non-volatile computer-readable storage medium is provided. The non-volatile computer-readable storage medium is configured to store computer programs which, when executed by a computer, enable the computer to execute the following. A material-cage image is obtained by photographing a first stacking apparatus of a first material cage and a second stacking apparatus of a second material cage. First target detection is performed on the material-cage image with a first detection model to recognize the first stacking apparatus of the first material cage and the second stacking apparatus of the second material cage. First location information of the first stacking apparatus and second location information of the second stacking apparatus are determined, and a first stacking result is determined based on the first location information and the second location information. Second target detection is performed on the material-cage image with a second detection model to extract feature information of the material-cage image, and a second stacking result is obtained based on feature information. Whether the first material cage can be stacked on the second material cage is determined based on the first stacking result and the second stacking result.

With the above method for determining material-cage stacking, the computer device, and the storage medium, before stacking the first material cage on the second material cage, the corresponding material-cage image is obtained by photographing the stacking apparatuses of the first material cage and the second material cage. The stacking apparatuses of the two material cages in the material-cage image can be recognized respectively with two detection models. The first stacking result is obtained by determining the location information of the stacking apparatuses of the two material cages with the first detection model, and the second stacking result corresponding to the stacking apparatuses of the two material cages is obtained with the second detection model. Whether the first material cage can be stacked on the second material cage can be determined based on the stacking results that are obtained with the two detection models in different manners. As such, with the two detection models and without manual determination, it is possible to determine quickly and accurately whether the two material cages can be stacked, thereby greatly increasing determining efficiency of material-cage stacking.

DETAILED DESCRIPTION

In order to make the purposes, technical solutions, and advantages of the present disclosure clearer, the following will describe the present disclosure in detail with a combination of accompanying drawings and implementations. It should be understood that, specific implementations described herein are merely for explaining, rather than limiting, the present disclosure.

Figure 1:
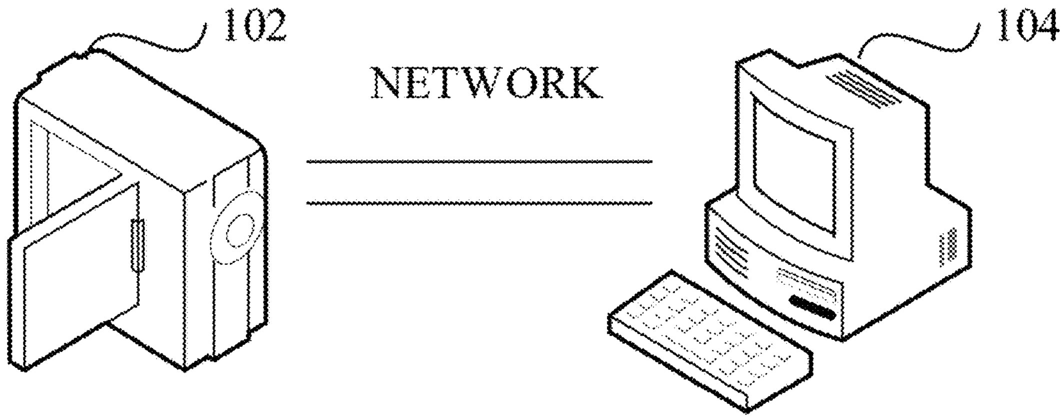
FIG. 1 is diagram illustrating an environment where a method for determining material-cage stacking in an implementation is applied.

A method for determining material-cage stacking provided in the disclosure can be applied to an environment illustrated in FIG. 1. As illustrated in FIG. 1, an image obtaining device 102 communicates with a computer device 104 via a network. Before stacking a first material cage on a second material cage, the image obtaining device 102 obtains a material-cage image by photographing a first stacking apparatus of the first material cage and a second stacking apparatus of the second material cage, and then transmits the material-cage image to the computer device 104. The computer device 104 performs first target detection on the material-cage image with a first detection model to recognize the first stacking apparatus of the first material cage and the second stacking apparatus of the second material cage. The computer device 104 then determines first location information of the first stacking apparatus and second location information of the second stacking apparatus, and determines a first stacking result based on the first location information and the second location information. The computer device 104 performs second target detection on the material-cage image with a second detection model to extract feature information of the material-cage image, and obtains a second stacking result based on the feature information. The computer device 104 determines a final stacking result, i.e., the final stacking result is whether the first material cage can be stacked on the second material cage, based on the first stacking result and the second stacking result. Trigger operations of stacking the first material cage on the second material cage if it is determined that the first material cage can be stacked on the second material cage. Trigger operations of preventing the first material cage from being stacked on the second material cage if it is determined that the first material cage cannot be stacked on the second material cage. The image obtaining device 102 may be but is not limited to various image photographing apparatuses, e.g., a high definition (HD) camera, an HD in-vehicle camera, a charge coupled device (CCD) camera, a scanner, or a mobile phone with a camera function. The computer device 104 may specifically be a terminal or a server, where the terminal may be but is not limited to various personal computers, notebook computers, smart phones, tablet computers, portable wearable devices, or industrial personal computers (IPCs) on warehousing and transportation tools, and the server may be implemented by an independent server or a server cluster composed of multiple servers.

The above feature information may be profile information, e.g., profile information of the first stacking apparatus and the second stacking apparatus. For example, when the first stacking apparatus and the second stacking apparatus each include foot cups and piers, the profile information includes profile information of the foot cups and profile information of the piers, and thus whether objects in the material-cage image are foot cups and piers can be determined according to the profile information.

Figure 2:
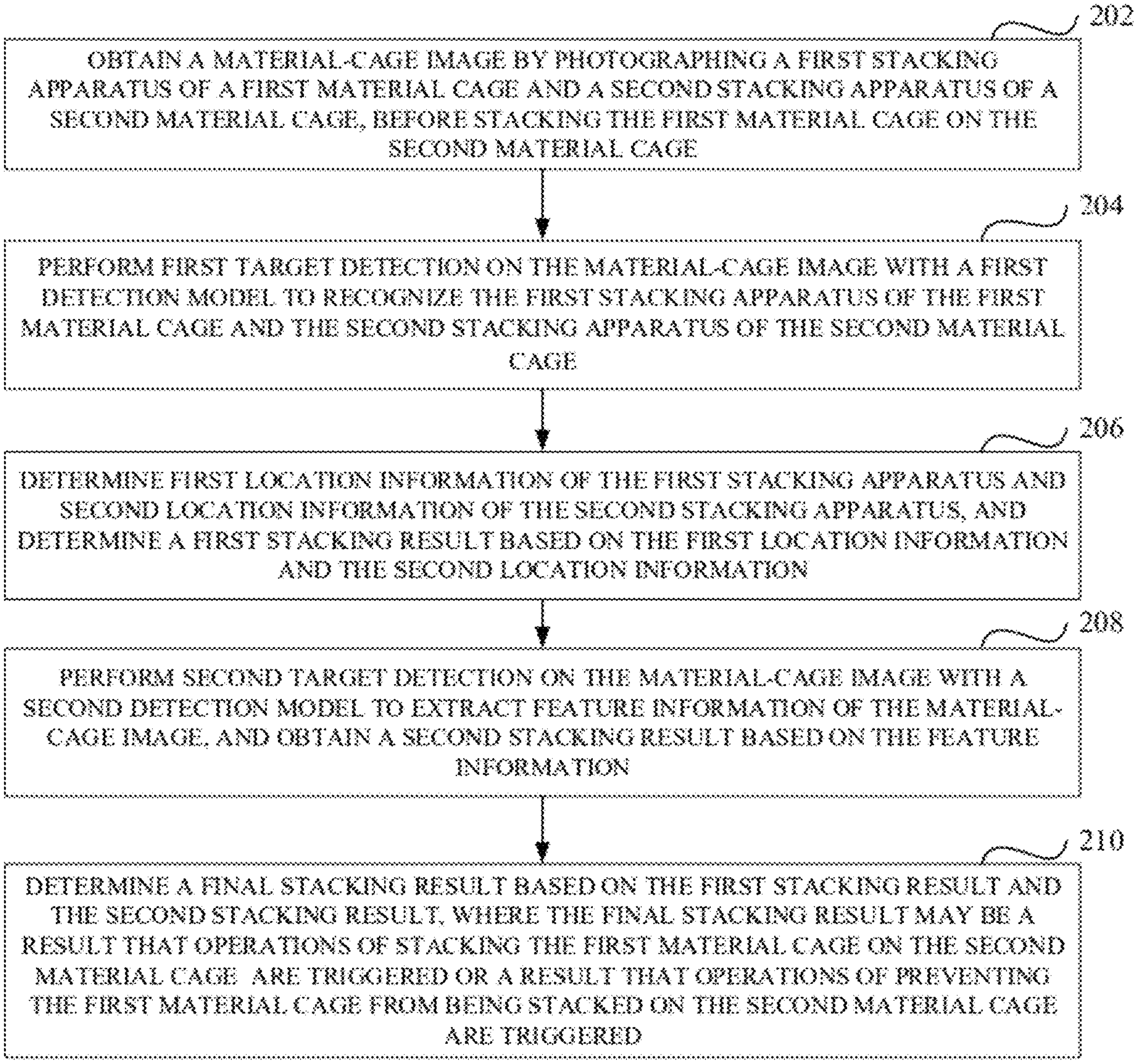
FIG. 2 is a schematic flow chart illustrating a method for determining material-cage stacking in an implementation.

In an implementation, a method for determining material-cage stacking is provided. The method applied to the computer device in FIG. 1 is taken as an example for illustration. As illustrated in FIG. 2, the method includes the following operations.

At 202, a material-cage image is obtained by photographing a first stacking apparatus of a first material cage and a second stacking apparatus of a second material cage. The operation at 202 is performed before stacking the first material cage on the second material cage.

Terms “first”, “second”, and the like herein are only used for ease of description and not intended to limit orders or structures of material cages. The first material cage and the second material cage may have a same structure, and the first stacking apparatus and the second stacking apparatus may also have a same structure. The first material cage and the second material cage are collectively called material cages, and the first stacking apparatus and the second stacking apparatus are collectively called stacking apparatuses.

The material cages are generally of logistics containers composed of metal and steel raw materials welded and are used to store goods. The material cages may also be made of other materials, e.g., wood, plastics, or other metals. It is possible to improve effective utilization of warehousing space by material-cage stacking.

Figure 3A:
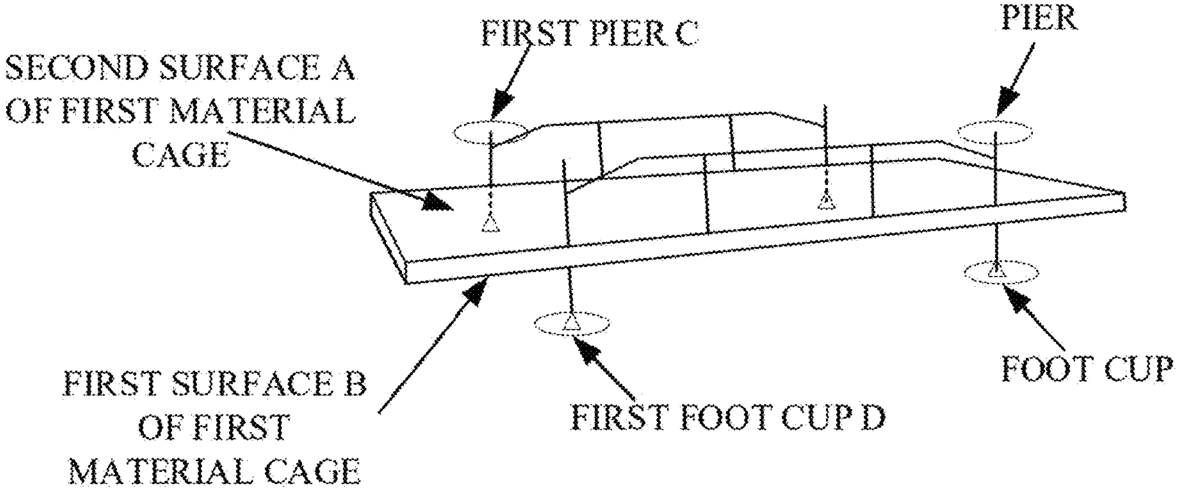
FIG. 3A is a schematic structural diagram illustrating a first material cage in an implementation.
Figure 3B:
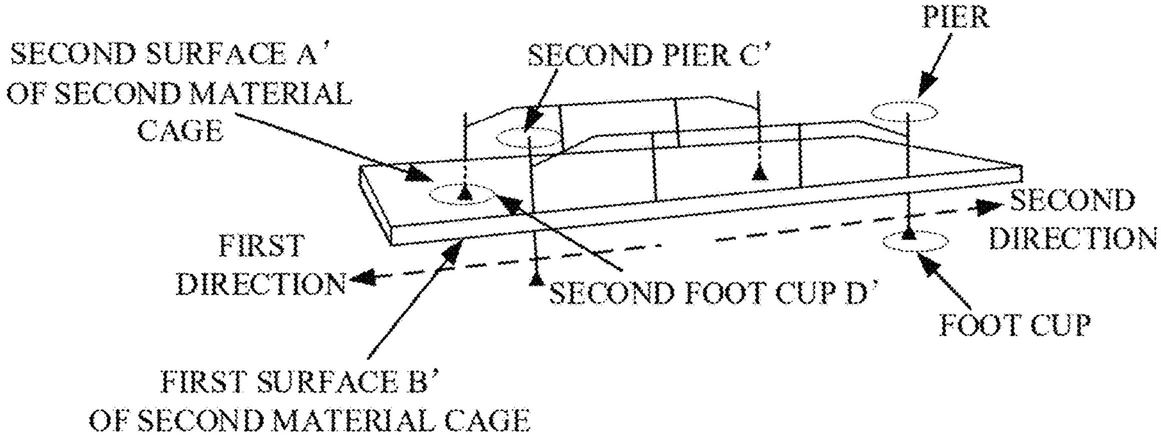
FIG. 3B is a schematic structural diagram illustrating a second material cage in an implementation.

The stacking apparatuses are a foot cup and a pier on a same material cage, and in the same material cage, the foot cup is located under the pier when the material cage is to be stacked on another material cage or is stacked on another material cage, referring to FIG. 3A and FIG. 3B, which are schematic structural diagrams illustrating material cages.

A material cage includes a material-cage body for carrying goods, a foot cup disposed on a first surface of the material-cage body, and a pier disposed on a second surface of the material-cage body, where a pier of one material cage can be matched with a foot cup of the other material cage to-be-stacked, to realize stacking between the two material cages. For each material cage, N foot cups and N piers are included, preferably $4 \leq N$. For example, in an implementation, N=4, referring to FIG. 3A and FIG. 3B, which are schematic structural diagrams illustrating material cages. A foot cup located at a first surface of the first material cage is matched with a pier located at a second surface of the second material cage when the two material cages need to be stacked. When the two material cages are stacked, the matched foot cup and the pier are aligned with each other in a vertical direction, forming a stacking group. The two stacked material cages totally have 4 stacking groups when each material cage includes 4 foot cups and 4 piers. It can be understood that, a material cage may further include more or less foot cups and piers, e.g., each material cage has 6 foot cups and 6 piers, which is not limited herein. As illustrated in FIG. 3A and FIG. 3B, a material cage further includes limit baffles, where the limit baffles are disposed on opposite sides of the second surface of the material-cage body and used to prevent goods from falling from the material-cage body.

Figure 4:
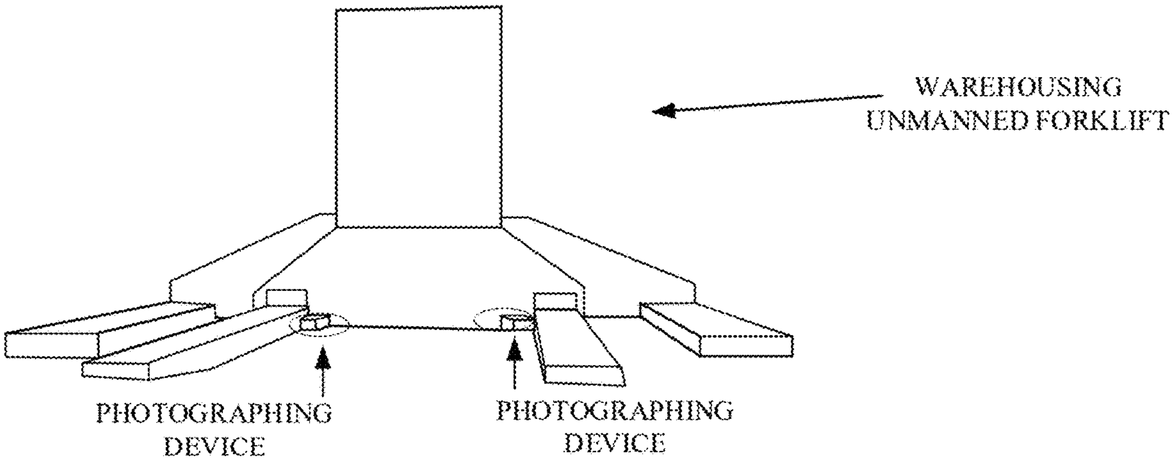
FIG. 4 is a schematic structural diagram illustrating a warehousing unmanned forklift in an implementation.

A warehousing unmanned forklift includes an IPC and an image obtaining device, where the IPC and the image obtaining device are in a same internal network, referring to a FIG. 4, which is a schematic structural diagram illustrating a warehousing unmanned forklift. Specifically, before stacking the first material cage on the second material cage, the warehousing unmanned forklift photographs the first stacking apparatus of the first material cage and the second stacking apparatus of the second material cage with the image obtaining device, and the IPC of the warehousing unmanned forklift obtains the material-cage image photographed with the image obtaining device. For example, when the warehousing unmanned forklift wants to stack the first material cage, which was placed on the forklift, on the second material cage, the image obtaining device of the warehousing unmanned forklift photographs the first stacking apparatus of the first material cage and the second stacking apparatus of the second material cage and obtains the photographed material-cage image with the IPC of the warehousing unmanned forklift. The image obtaining device may be but is not limited to various image photographing apparatuses, e.g., an HD camera, an HD in-vehicle camera, a CCD camera, a scanner, a mobile phone with a camera function, a tablet computer, or other devices, and the warehousing unmanned forklift may be but is not limited to various unmanned devices, e.g., unmanned vehicles, unmanned aerial vehicles (UAVs), or the like.

At 204, first target detection is performed on the material-cage image with a first detection model to recognize the first stacking apparatus of the first material cage and the second stacking apparatus of the second material cage.

The first detection model is a detection model of the computer device, e.g., a detection model you only look once v5 (Yolov5) deployed on the IPC of the warehousing unmanned forklift through open visual inference & neural network optimization (OpenVINO), where the detection model is run through programs set by the IPC. The OpenVINO is a comprehensive toolkit for rapid development of applications and solutions. The Yolov5 algorithm belongs to a Yolo algorithm series and is a deep neural network-based object recognition and positioning algorithm for quick and efficient target detection.

Specifically, the computer device performs the first target detection by inputting the obtained material-cage image to the first detection model, to recognize the first stacking apparatus of the first material cage and the second stacking apparatus of the second material cage according to the material-cage image. For example, the IPC of the warehousing unmanned forklift performs the first target detection by inputting the material-cage image to the first detection model Yolov5 deployed through the OpenVINO, to recognize the first stacking apparatus of the first material cage and the second stacking apparatus of the second material cage through the target detection.

At 206, first location information of the first stacking apparatus and second location information of the second stacking apparatus are determined, and a first stacking result is determined based on the first location information and the second location information.

The first location information is coordinate information of the first stacking apparatus, and the second location information is coordinate information of the second stacking apparatus. The first stacking result is whether the first material cage can be stacked on the second material cage. If the first material cage can be stacked on the second material cage, the first stacking result is “success” and can be recorded as 1. If the first material cage cannot be stacked on the second material cage, the first stacking result is “fail” and can be recorded as 0.

Specifically, the computer device determines first coordinate information of the first stacking apparatus and second coordinate information of the second stacking apparatus based on the first stacking apparatus and the second stacking apparatus recognized with the first detection model, and determines the first stacking result based on the first coordinate information and the second coordinate information. For example, the IPC of the warehousing unmanned forklift obtains the first coordinate information of the first stacking apparatus and the second coordinate information of the second stacking apparatus based on the first stacking apparatus and the second stacking apparatus recognized with the first detection model, and determines the first stacking result based on the first coordinate information and the second coordinate information. When the first material cage can be stacked on the second material cage, the first stacking result is “success” and can be recorded as 1. When the first material cage cannot be stacked on the second material cage, the first stacking result is “fail” and can be recorded as 0.

At 208, second target detection is performed on the material-cage image with a second detection model to extract feature information of the material-cage image, and a second stacking result is obtained based on the feature information.

The second detection model is a detection model Yolov5 deployed on the IPC through the OpenVINO and run through programs set by the IPC. The OpenVINO is a comprehensive toolkit for rapid development of applications and solutions. The Yolov5 is used for quick and efficient target detection. The second detection model can directly obtain a detection result according to an inputted image. The second stacking result is whether the first material cage can be stacked on the second material cage. If the first material cage can be stacked on the second material cage, the second stacking result is “success” and can be recorded as 1. If the first material cage cannot be stacked on the second material cage, the second stacking result is “fail” and can be recorded as 0.

Specifically, the computer device performs the second target detection by inputting the obtained material-cage image to the second detection model to extract the feature information of the material-cage image, and obtains the second stacking result based on the feature information. The feature information for example may be an image feature. For example, the IPC of the warehousing unmanned forklift performs the second target detection by inputting the material-cage image to the second detection model Yolov5 deployed through the OpenVINO to extract an image feature of the material-cage image, and the second detection model directly obtains the second stacking result based on the image feature. When the first material cage can be stacked on the second material cage, the second stacking result is "success" and can be recorded as 1. When the first material cage cannot be stacked on the second material cage, the second stacking result is "fail" and can be recorded as 0.

At 210, a final stacking result, i.e., whether the first material cage can be stacked on the second material cage, is determined based on the first stacking result and the second stacking result. If the first material cage can be stacked on the second material cage, operations of stacking the first material cage on the second material cage can be triggered. Otherwise, if the first material cage cannot be stacked on the second material cage, operations of preventing the first material cage from being stacked on the second material cage can be triggered.

Specifically, the computer device determines the final stacking result of the first material cage and the second material cage based on the first stacking result and the second stacking result. The final stacking result may be a result that the IPC of the warehousing unmanned forklift triggers the operations of stacking the first material cage on the second material cage or a result that the warehousing unmanned forklift prevents the first material cage from being stacked on the second material cage, where the preventing operations may be indication information or operations of directly forbidding the warehousing unmanned forklift from stacking the first material cage on the second material cage.

In the above method for determining material-cage stacking, before stacking the first material cage on the second material cage, the material-cage image is obtained by photographing the stacking apparatuses of the first material cage and the second material cage. The stacking apparatuses of the two material cages in the material-cage image can be recognized respectively with the two detection models. The first stacking result is obtained by obtaining the location information of the stacking apparatuses of the two material cages with the first detection model, and the second stacking result is obtained with the second detection model. The final stacking result can be obtained based on the stacking results that are obtained with the two detection models in different manners. As such, it is possible to determine with the two detection models whether the material cages can be stacked quickly and accurately, greatly increasing determining efficiency of material-cage stacking compared with manual determination of whether the two material cages can be stacked in the related art.

In an implementation, the material-cage image includes a first material-cage image and a second material-cage image. The material-cage image is obtained by photographing the first stacking apparatus of the first material cage and the second stacking apparatus of the second material cage as follows. The first material-cage image is obtained by photographing the first stacking apparatus in a first direction of the first material cage and the second stacking apparatus in the first direction of the second material cage. The second material-cage image is obtained by photographing the first stacking apparatus in a second direction of the first material cage and the second stacking apparatus in the second direction of the second material cage, where the first direction is different from the second direction.

The image obtaining device is placed at two sides of the warehousing unmanned forklift, i.e., the image obtaining device includes a first image obtaining device and a second image obtaining device, referring to FIG. 4, which illustrates locations of image obtaining devices installed on the warehousing unmanned forklift. The first direction and the second direction are the two sides of the warehousing unmanned forklift. The first image obtaining device is used to obtain an image in the second direction, and the second image obtaining device is used to obtain an image in the first direction, where the first direction may be a left side of the warehousing unmanned forklift, and the second direction may be a right side of the warehousing unmanned forklift.

Specifically, before stacking the first material cage on the second material cage, the second image obtaining device obtains the first material-cage image by photographing the first stacking apparatus in the first direction of the first material cage and the second stacking apparatus in the first direction of the second material cage, and the first image obtaining device obtains the second material-cage image by photographing the first stacking apparatus in the second direction of the first material cage and the second stacking apparatus in the second direction of the second material cage. For example, when the warehousing unmanned forklift wants to stack the first material cage, which was placed on the forklift, on the second material cage, the second image obtaining device at the left side of the warehousing unmanned forklift obtains the first material-cage image by photographing stacking apparatuses at a right side of the first material cage and the second material cage, and the first image obtaining device at the right side of the warehousing unmanned forklift obtains the second material-cage image by photographing stacking apparatuses at a left side of the first material cage and the second material cage.

In the implementation, before stacking the first material cage on the second material cage, the first material-cage image is obtained by photographing the first stacking apparatus in the first direction of the first material cage and the second stacking apparatus in the first direction of the second material cage, and the second material-cage image is obtained by photographing the first stacking apparatus in the second direction of the first material cage and the second stacking apparatus in the second direction of the second material cage. As such, a more detailed material-cage image can be obtained, which is beneficial to determining the final stacking result of material-cage stacking and further improving reliability and accuracy of the final stacking result.

Figure 5:
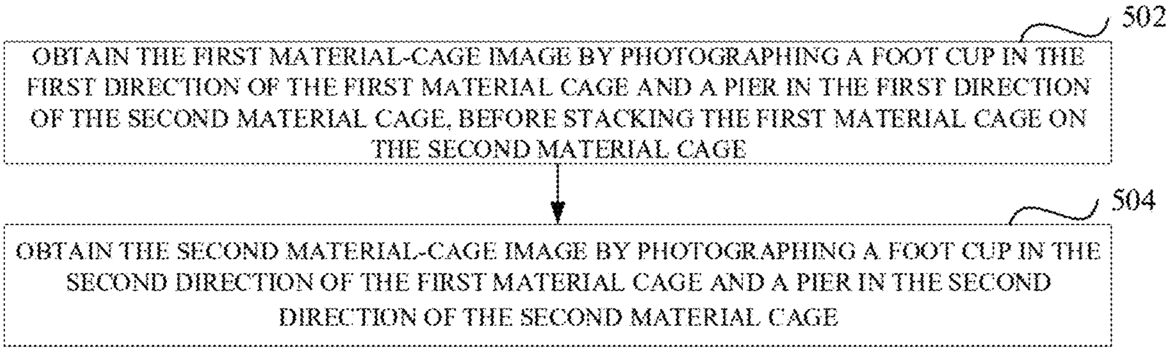
FIG. 5 is a schematic flow chart illustrating obtaining of a material-cage image in an implementation.

In an implementation, the stacking apparatuses each include foot cups and piers matched with the foot cups. As illustrated in FIG. 5, before stacking the first material cage on the second material cage, the first material-cage image is obtained by photographing the first stacking apparatus in the first direction of the first material cage and the second stacking apparatus in the first direction of the second material cage, and the second material-cage image is obtained by photographing the first stacking apparatus in the second direction of the first material cage and the second stacking apparatus in the second direction of the second material cage as follows.

At 502, before stacking the first material cage on the second material cage, the first material-cage image is obtained by photographing a foot cup in the first direction of the first material cage and a pier in the first direction of the second material cage.

Specifically, before stacking the first material cage on the second material cage, the second image obtaining device of the warehousing unmanned forklift obtains the first material-cage image by photographing the foot cup in the first direction of the first material cage and the pier in the first direction of the second material cage. For example, when the warehousing unmanned forklift wants to stack the first material cage, which was placed on the forklift, on the second material cage, the second image obtaining device at the left side of the warehousing unmanned forklift obtains the first material-cage image by photographing a foot cup at the right side of the first material cage and a pier at the right side of the second material cage.

At 504, the second material-cage image is obtained by photographing a foot cup in the second direction of the first material cage and a pier in the second direction of the second material cage.

Specifically, the first image obtaining device of the warehousing unmanned forklift obtains the second material-cage image by photographing the foot cup in the second direction of the first material cage and the pier in the second direction of the second material cage. For example, the first image obtaining device at the right side of the warehousing unmanned forklift obtains the second material-cage image by photographing a foot cup at the left side of the first material cage and a pier at the left side of the second material cage.

In the implementation, before stacking the first material cage on the second material cage, the first material-cage image is obtained by photographing the foot cup in the first direction of the first material cage and the pier in the first direction of the second material cage, and the second material-cage image is obtained by photographing the foot cup in the second direction of the first material cage and the pier in the second direction of the second material cage. As such, a more detailed material-cage image can be obtained, which is beneficial to determining the final stacking result of material-cage stacking and further improving reliability and accuracy of the final stacking result.

In an implementation, the first target detection is performed on the material-cage image with the first detection model to recognize the first stacking apparatus of the first material cage and the second stacking apparatus of the second material cage as follows. The feature information of the material-cage image is obtained with the first detection model, and the first stacking apparatus of the first material cage and the second stacking apparatus of the second material cage are recognized according to the feature information.

The first detection model is a detection model Yolov5 deployed on the IPC through the OpenVINO and run through programs set by the IPC. The OpenVINO is a comprehensive toolkit for rapid development of applications and solutions. The Yolov5 is for quick and efficient target detection.

Specifically, the computer device obtains feature information of an object in the material-cage image in real time with the aid of the first detection model by inputting the obtained material-cage image to the first detection model, and recognizes the first stacking apparatus of the first material cage and the second stacking apparatus of the second material cage by classifying the object based on the feature information of the object. For example, the IPC of the warehousing unmanned forklift inputs the material-cage image to the first detection model Yolov5 deployed through the OpenVINO, and the first detection model obtains feature information of an object in the material-cage image in real time, and recognizes the first stacking apparatus of the first material cage and the second stacking apparatus of the second material cage by classifying the object based on the feature information of the object.

In the implementation, by obtaining the feature information of the material-cage image with the first detection model, and recognizing the first stacking apparatus of the first material cage and the second stacking apparatus of the second material cage according to the feature information, information of the first stacking apparatus and the second stacking apparatus that are obtained with the first detection model can be obtained in real time, which is beneficial to determining the final stacking result of material-cage stacking and further improving reliability and accuracy of the final stacking result.

Figure 6:
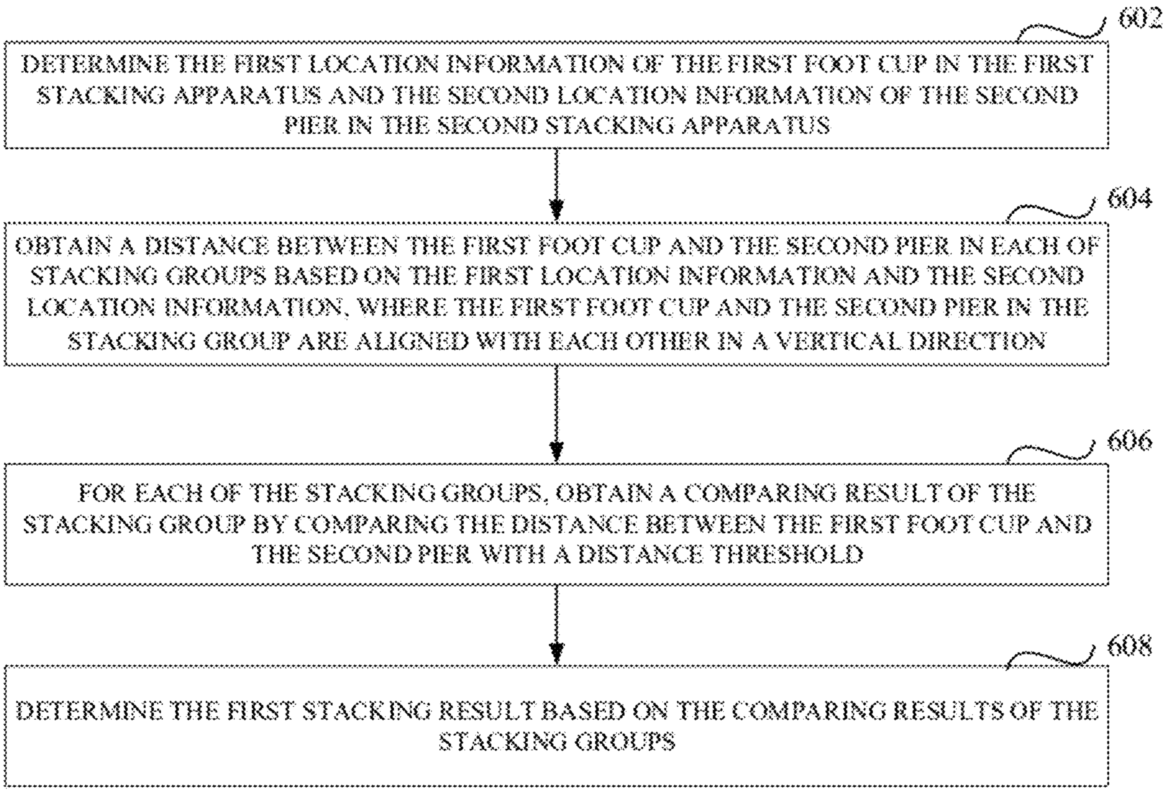
FIG. 6 is a schematic flow chart illustrating determination of a first stacking result in an implementation.

In an implementation, the first material cage has first surface B and second surface A opposite to the first surface B, where the first surface B may be a bottom surface of the first material cage, and the second surface A may be a top surface of the first material cage. For example, the first surface B refers to a surface of the first material cage close to or in contact with the second material cage when the first material cage is stacked on the second material cage. The first surface B of the first material cage has first foot cup D, and the second surface A has first pier C. First surface B' of the second material cage has second foot cup D', and second surface A' has second pier C'. The first foot cup D and the second pier C' compose a stacking group when the first material cage is stacked on the second material cage. As illustrated in FIG. 6, the first location information of the first stacking apparatus and the second location information of the second stacking apparatus are determined, and the first stacking result is determined based on the first location information and the second location information as follows.

At 602, the first location information of the first foot cup in the first stacking apparatus and the second location information of the second pier in the second stacking apparatus are determined.

The first location information of the first foot cup in the first stacking apparatus is first coordinate information of the first foot cup in the first surface of the first material cage, and the second location information of the second pier in the second stacking apparatus is second coordinate information of the second pier in the second surface of the second material cage.

Specifically, the computer device assigns a midpoint of a rectangular frame defined by the first foot cup and the second pier as a positioning point of the first foot cup and the second pier, and obtains the first location information of the first foot cup in the first stacking apparatus and the second location information of the second pier in the second stacking apparatus in real time according to internal and external parameters of an image obtaining device (e.g., a camera) and an equation of ground in a coordinate system of the image obtaining device. For example, the IPC of the warehousing unmanned forklift assigns the midpoint of the rectangular frame defined by the first foot cup and the second pier as the positioning point of the first foot cup and the second pier, and obtains the first coordinate information of the first foot cup in the first stacking apparatus and the second coordinate information of the second pier in the second stacking apparatus in real time according to the internal parameter (e.g., a focal length, a pixel of a camera, or the like), the external parameter (e.g., a camera location, a rotating direction, or the like), and a plane equation of the ground in the coordinate system of the image obtaining device. That is, any plane in a spatial coordinate system can be represented by a ternary linear equation $Ax+By+Cz+D=0$ of xyz (where A, B, C, and D are constants).

At 604, a distance between the first foot cup and the second pier in each of stacking groups is obtained based on the first location information and the second location information, where the first foot cup and the second pier in the stacking group are aligned with each other in a vertical direction when the first material cage is stacked on the second material cage.

Referring to FIG. 3A and FIG. 3B, which are schematic structural diagrams illustrating material cages, a material cage includes 4 piers and 4 foot cups. For the first foot cup in the first stacking apparatus and the second pier in the second stacking apparatus, a pier and a foot cup (for example, the first foot cup and the second pier) aligned with each other in a vertical direction compose a stacking group when the first material cage is stacked on the second material cage, therefore there can be 4 stacking groups.

Specifically, the computer device obtains the distance between the first foot cup and the second pier in each of the stacking groups based on the first location information and the second location information obtained in real time.

In an implementation, for each stacking group, the computer device performs subtraction on the first coordinate information of the first foot cup in the first stacking device and the second coordinate information of the second pier in the second stacking device, and a result of the subtraction represents the distance between the first foot cup and the second pier in each stacking group.

At 606, for each of the stacking groups, a comparing result of the stacking group is obtained by comparing the distance between the first foot cup and the second pier with a distance threshold.

Specifically, the computer device obtains the comparing result of the stacking group by comparing the distance between the first foot cup and the second pier in the stacking group with the distance threshold. The comparing result of the stacking group represents that the stacking group can be stacked when the distance between the first foot cup and the second pier in the stacking group is less than the distance threshold. The comparing result of the stacking group represents that the stacking group cannot be stacked when the distance between the first foot cup and the second pier in the stacking group is greater than or equal to the distance threshold. The distance threshold can be modified according to a shape of an actual material cage on site, which generally can be set to 1 cm.

At 608, the first stacking result is determined based on the comparing results of the stacking groups.

Specifically, the computer device determines the first stacking result based on the comparing results of the stacking groups.

In an implementation, the first stacking result is determined to be each of the comparing results of the stacking groups. Specifically, the computer device can directly determine the first stacking result to be the comparing results of the stacking groups. In other words, the first stacking result includes results of whether each stacking group can be stacked.

In another implementation, the computer device determines the first stacking result based on the comparing results of the stacking groups. For example, the first stacking result is that the first material cage can be stacked on the second material cage when the comparing results each indicate that the first material cage can be stacked on the second material cage. Specifically, the first stacking result is that the first material cage can be stacked on the second material cage when all comparing results of all stacking groups each represent that the first material cage can be stacked on the second material cage. The first stacking result is that the first material cage cannot be stacked on the second material cage when any one comparing result indicates that the first material cage cannot be stacked on the second material cage.

In the implementation, the first location information of the first foot cup in the first stacking apparatus and the second location information of the second pier in the second stacking apparatus are determined first. The distance between the first foot cup and the second pier in each of the stacking groups is obtained based on the first location information and the second location information. The comparing result of the stacking group is obtained by comparing the distance between the first foot cup and the second pier in the stacking group with the distance threshold. The first stacking result is determined based on the comparing results of the stacking groups. As such, it is beneficial to subsequently determining the final stacking result further in combination with the second stacking result, thereby improving efficiency of material-cage stacking.

Figure 7:
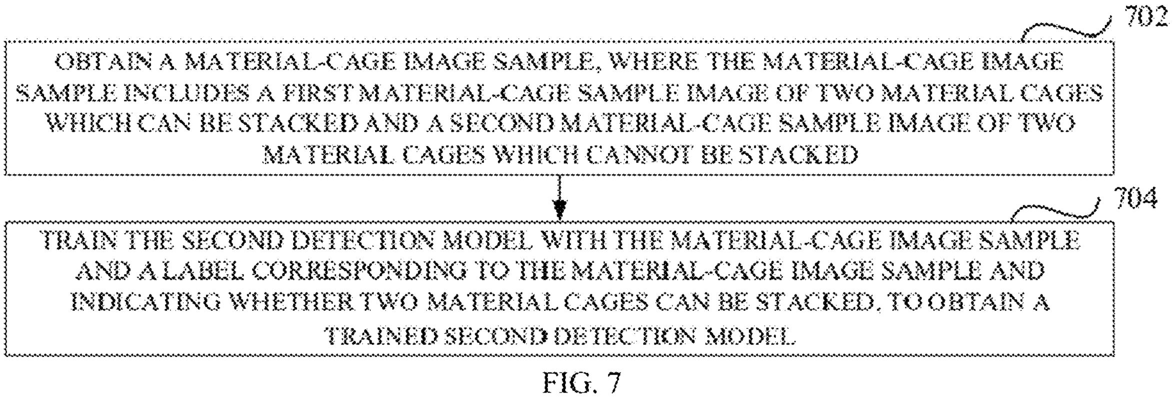
FIG. 7 is a schematic flow chart illustrating obtaining of a second detection model in an implementation.

In an implementation, as illustrated in FIG. 7, before performing the second target detection on the material-cage image with the second detection model to extract the feature information of the material-cage image and obtaining the second stacking result based on the feature information, the method further includes the following.

At 702, a material-cage image sample is obtained, where the material-cage image sample includes a first material-cage sample image of two material cages which can be stacked and a second material-cage sample image of two material cages which cannot be stacked.

Specifically, the computer device obtains one or more material-cage image samples with the image obtaining device of the warehousing unmanned forklift, where the material-cage image sample includes the first material-cage sample image of two material cages which can be stacked and the second material-cage sample image of two material cages which cannot be stacked.

At 704, the second detection model is trained with the material-cage image sample and a label corresponding to the material-cage image sample and indicating whether two material cages can be stacked, to obtain a trained second detection model.

Specifically, the computer device trains the Yolov5-based second detection model with the material-cage image sample and the label corresponding to the material-cage image sample and indicating whether two material cages can be stacked, to obtain the trained second detection model, where the second detection model can directly obtain a material-cage stacking result according to the material-cage image sample.

In the implementation, the material-cage image sample is obtained, where the material-cage image sample includes the first material-cage sample image of two material cages which can be stacked and the second material-cage sample image of two material cages which cannot be stacked. The second detection model is trained with the material-cage image sample and the label corresponding to the material-cage image sample and indicating whether two material cages can be stacked, to obtain the trained second detection model. Therefore, in a real scenario, the second stacking result can be directly obtained by inputting the obtained material-cage image to the trained second detection model, which is beneficial to subsequently determining the final stacking result further in combination with the first stacking result, thereby improving efficiency of material-cage stacking.

Figure 8:
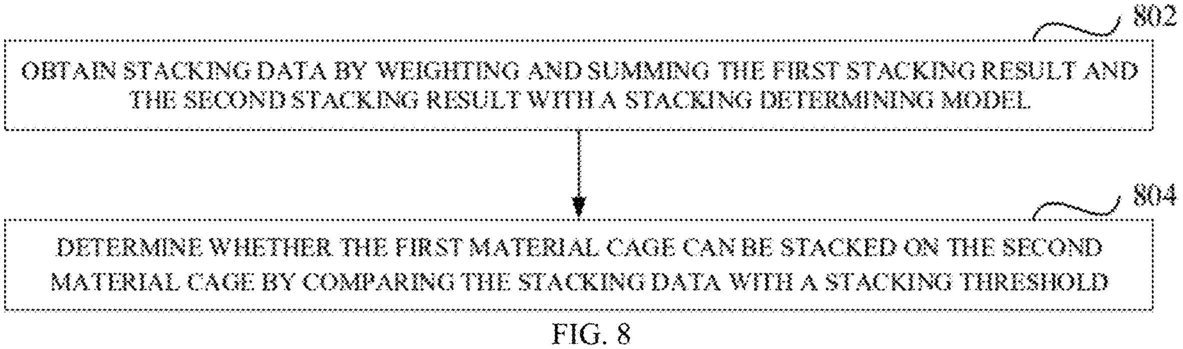
FIG. 8 is a schematic flow chart illustrating determination of whether a first material cage can be stacked on a second material cage in an implementation.

In an implementation, as illustrated in FIG. 8, whether the first material cage can be stacked on the second material cage is determined based on the first stacking result and the second stacking result as follows.

At 802, stacking data is obtained by weighting and summing the first stacking result and the second stacking result with a stacking determining model.

The stacking determining model is a trained classifier. A weight of the first stacking result and a weight of the second stacking result can be obtained with the trained classifier and a stacking threshold can be determined.

Specifically, the computer device inputs the first stacking result and the second stacking result to the stacking determining model, and obtains the stacking data by weighting and summing the first stacking result and the second stacking result according to the weight of the first stacking result and the weight of the second stacking result in the stacking determining model.

In an implementation, the stacking determining model is the trained classifier. The computer device inputs a comparing result of a stacking group in the first stacking result and a comparing result of a stacking group in the second stacking result to the classifier. Then based on a weight distribution of the two stacking results in the classifier, first stacking data is obtained by multiplying the first stacking result and the weight of the first stacking result, and second stacking data is obtained by multiplying the second stacking result and the weight of the second stacking result. The stacking data is obtained by adding the first stacking data to the second stacking data.

At 804, whether the first material cage can be stacked on the second material cage is determined by comparing the stacking data with the stacking threshold.

Specifically, the computer device determines whether the first material cage can be stacked on the second material cage by comparing the stacking data with the stacking threshold. It is determined that the first material cage can be stacked on the second material cage when the stacking results each indicate that the first material cage can be stacked on the second material cage. When the final stacking result is that the first material cage can be stacked on the second material cage, a perception program outputs the final stacking result of the two material cages to a main program of the warehousing unmanned forklift based on javascript object notation remote procedure call (JSONRPC) communication, where the JSONRPC is a JSON-based cross-language remote call transfer protocol. The warehousing unmanned forklift receives the final stacking result. When the final stacking result indicates that the first material cage can be stacked on the second material cage, the warehousing unmanned forklift triggers the operations of stacking the first material cage on the second material cage to directly stack the first material cage on the second material cage. When the final stacking result indicates that the first material cage cannot be stacked on the second material cage, the warehousing unmanned forklift triggers the operations of preventing the first material cage from being stacked on the second material cage, reports an error, and stops a current action.

In the implementation, the stacking data is obtained by weighting and summing the first stacking result and the second stacking result with the stacking determining model first. Whether the first material cage can be stacked on the second material cage is determined by comparing the stacking data with the stacking threshold. Therefore, whether the two material cages can be stacked can be determined quickly and accurately by comprehensively considering the two stacking results with the stacking determining model, thereby improving efficiency of material-cage stacking.

It should be understood that although the various steps in the flowchart of FIG. 2 and FIGS. 5-8 are shown in sequence according to the arrows, these steps are not necessarily executed in the sequence shown by the arrows. Unless explicitly stated herein, the execution of these steps is not strictly limited to the order, and the steps may be executed in other orders. Moreover, at least a part of the steps in FIG. 2 and FIGS. 5-8 may include multiple steps or multiple stages, and these steps or stages are not necessarily executed at the same time, but may be executed at different times, and the execution sequence of these steps or stages is also It does not have to be performed sequentially, but may be performed alternately or alternately with other steps or at least a portion of the steps or stages within the other steps.

Figure 9:
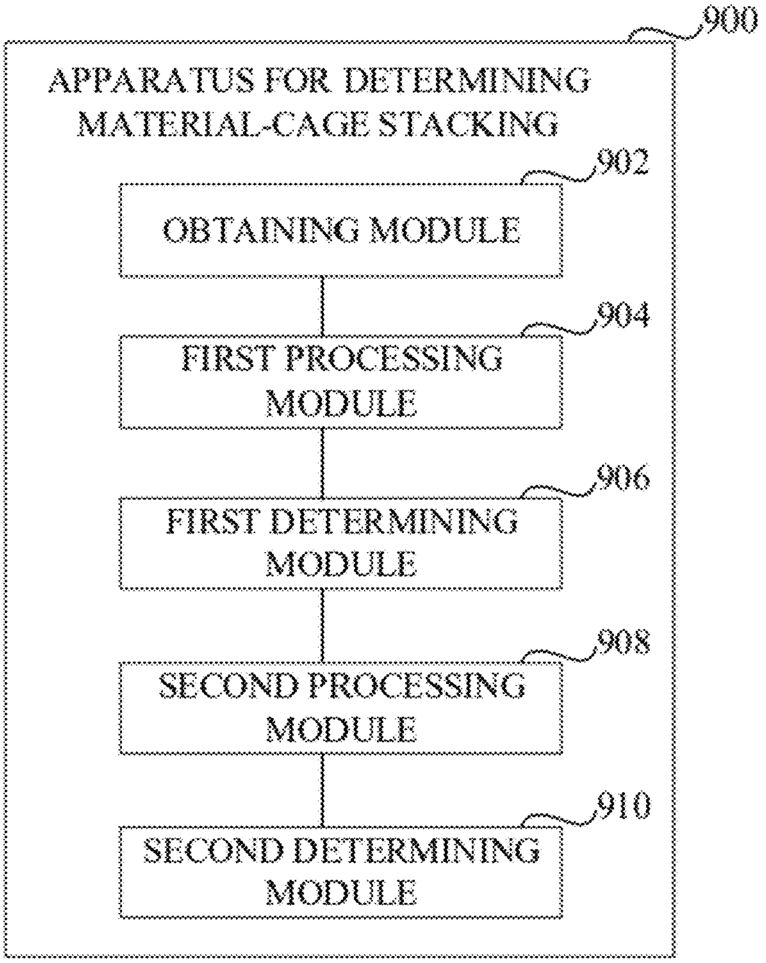
FIG. 9 is a structural block diagram illustrating an apparatus for determining material-cage stacking in an implementation.

In an implementation, as illustrated in FIG. 9, an apparatus for determining material-cage stacking is provided. An apparatus 900 includes an obtaining module 902, a first processing module 904, a first determining module 906, a second processing module 908, and a second determining module 910.

The obtaining module 902 is configured to obtain a material-cage image by photographing a first stacking apparatus of a first material cage and a second stacking apparatus of a second material cage. The obtaining module may be an apparatus with an image obtaining function such as a camera, a camcorder, a webcam, or the like.

The first processing module 904 is configured to perform first target detection on the material-cage image with a first detection model to recognize the first stacking apparatus of the first material cage and the second stacking apparatus of the second material cage.

The first determining module 906 is configured to determine a first stacking result based on first location information of the first stacking apparatus and second location information of the second stacking apparatus.

The second processing module 908 is configured to perform second target detection on the material-cage image with a second detection model to extract feature information of the material-cage image, and obtain a second stacking result based on the feature information.

The second determining module 910 is configured to determine a final stacking result, i.e., the final stacking result is whether the first material cage can be stacked on the second material cage, based on the first stacking result and the second stacking result. Trigger operations of stacking the first material cage on the second material cage if it is determined determining that the first material cage can be stacked on the second material cage. Trigger operations of preventing the first material cage from being stacked on the second material cage if it is determined determining that the first material cage cannot be stacked on the second material cage.

In an implementation, before stacking the first material cage on the second material cage, the obtaining module 902 is configured to obtain the first material-cage image by photographing the first stacking apparatus in a first direction of the first material cage and the second stacking apparatus in the first direction of the second material cage. The obtaining module 902 is further configured to obtain the second material-cage image by photographing the first stacking apparatus in a second direction of the first material cage and the second stacking apparatus in the second direction of the second material cage, where the first direction is different from the second direction.

In an implementation, before stacking the first material cage on the second material cage, the obtaining module 902 is configured to obtain the first material-cage image by photographing a foot cup in the first direction of the first material cage and a pier in the first direction of the second material cage. The obtaining module 902 is further configured to obtain the second material-cage image by photographing a foot cup in the second direction of the first material cage and a pier in the second direction of the second material cage.

In an implementation, the first processing module 904 is configured to obtain the feature information of the material-cage image with the first detection model, and recognize the first stacking apparatus of the first material cage and the second stacking apparatus of the second material cage according to the feature information.

In an implementation, the first determining module 906 is configured to determine the first location information of the first foot cup in the first stacking apparatus and the second location information of the second pier in the second stacking apparatus. The first determining module 906 is further configured to obtain a distance between the first foot cup and the second pier in each of stacking groups based on the first location information and the second location information, where the first foot cup and the second pier in a same stacking group are aligned with each other in a vertical direction when the first material cage is stacked on the second material cage; for each of the stacking groups. The first determining module 906 is further configured to obtain a comparing result of the stacking group by comparing the distance between the first foot cup and the second pier with a distance threshold, and determine the first stacking result based on the comparing results of the stacking groups.

Figure 10:
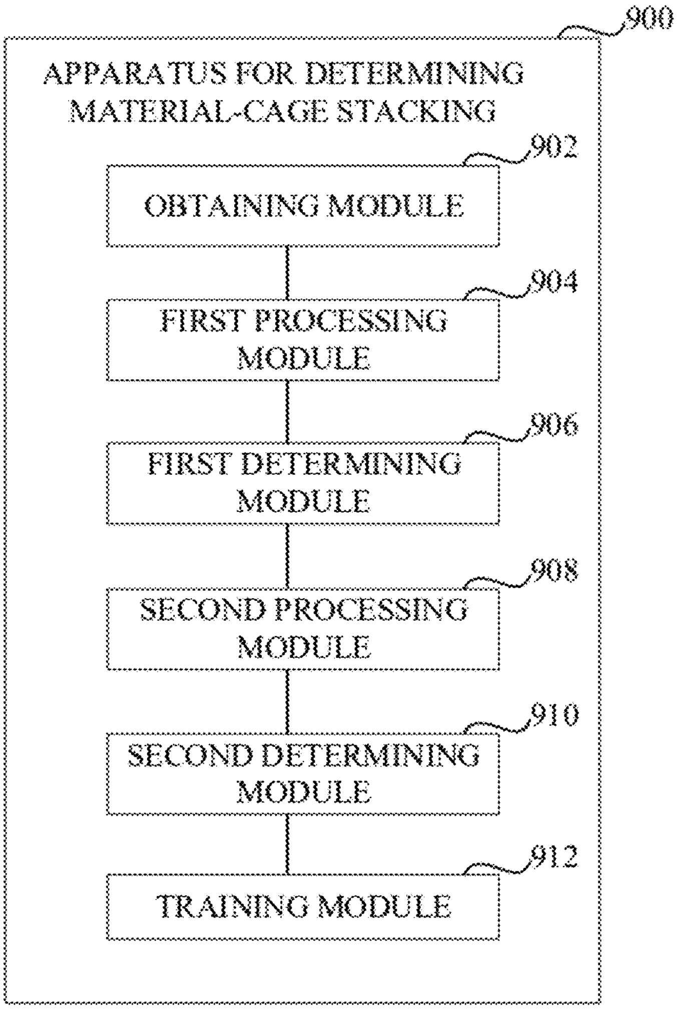
FIG. 10 is a structural block diagram illustrating an apparatus for determining material-cage stacking in another implementation.

In an implementation, as illustrated in FIG. 10, the apparatus further includes a training module 912. The training module 912 is configured to obtain a material-cage image sample, where the material-cage image sample includes a first material-cage sample image of two material cages which can be stacked and a second material-cage sample image of two material cages which cannot be stacked. The training module 912 is further configured to train the second detection model with the material-cage image sample and a label corresponding to the material-cage image sample and indicating whether two material cages can be stacked, to obtain a trained second detection model.

In an implementation, the second determining module is configured to obtain stacking data by weighting and summing the first stacking result and the second stacking result with a stacking determining model, and determine whether the first material cage can be stacked on the second material cage by comparing the stacking data with a stacking threshold.

For the specific definition of the apparatus for determining material-cage stacking, please refer to the above definition of the method for determining material-cage stacking, which will not be repeated here. Each module in the above-mentioned apparatus for determining material-cage stacking can be implemented in whole or in part by software, hardware, and combinations thereof. The above modules can be embedded in or independent of a processor in the computer device in the form of hardware, or stored in a memory in the computer device in the form of software, so that the processor can invoke and execute the operations corresponding to the above modules.

Figure 11:
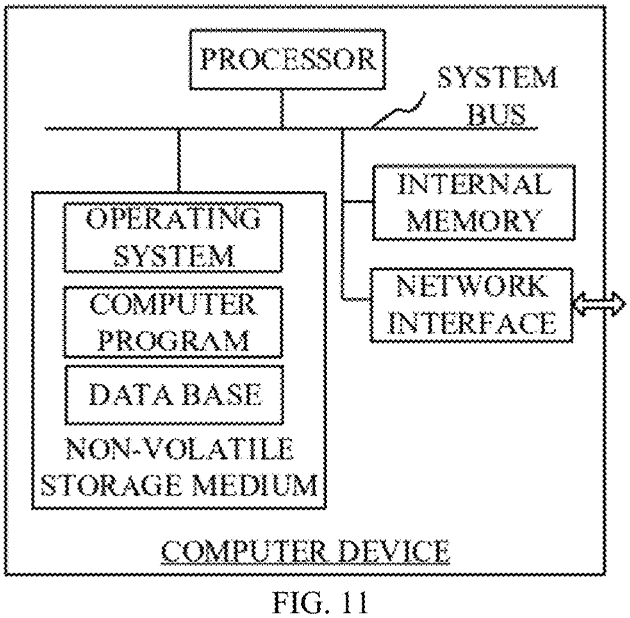
FIG. 11 is an internal structural diagram illustrating a computer device in an implementation.

In an implementation, a computer device is provided. The computer device may be a server, and an internal structural diagram thereof is illustrated in FIG. 11. The computer device includes a processor coupled via a system bus, a memory, and a network interface. The processor of the computer device is configured to provide computing and control functions. The memory of the computer device includes a non-volatile storage medium or an internal memory. The non-volatile storage medium is configured to store an operating system, a computer program, and a data base. The internal memory is configured to provide an environment for running of the operating system and the computer program in the non-volatile storage medium. The data base of the computer device is configured to store determining data of material-cage stacking. The network interface of the computer device is configured to communicate with an external terminal through network connection. The computer program is executed by the processor to implement a method for determining material-cage stacking.

The processor is coupled with an image obtaining apparatus such as a camera, to obtain the above-mentioned material-cage image with the image obtaining apparatus. The image obtaining apparatus may be a component or an external component of the computer device.

Those of ordinary skill in the art can understand that the structure illustrated in FIG. 11 is only a block diagram of a part of the structure related to the solution of the present disclosure, and does not constitute a limitation on the computer device to which the solution of the present disclosure is applied. Include more or fewer components than illustrated in the figures, or combine certain components, or have a different arrangement of components.

In one implementation, a computer device is provided and includes a memory and a processor. The memory is configured to store computer programs which, when executed by a processor, enable the processor to execute the following. A material-cage image is obtained by photographing a first stacking apparatus of a first material cage and a second stacking apparatus of a second material cage with an image obtaining device. First target detection is performed on the material-cage image with a first detection model to recognize the first stacking apparatus of the first material cage and the second stacking apparatus of the second material cage. First location information of the first stacking apparatus and second location information of the second stacking apparatus are determined, and a first stacking result is determined based on the first location information and the second location information. Second target detection is performed on the material-cage image with a second detection model to extract feature information of the material-cage image, and obtain a second stacking result based on the feature information. Whether the first material cage can be stacked on the second material cage is determined, based on the first stacking result and the second stacking result. Trigger operations of stacking the first material cage on the second material cage if it is determined determining that the first material cage can be stacked on the second material cage. Trigger operations of preventing the first material cage from being stacked on the second material cage if it is determined determining that the first material cage cannot be stacked on the second material cage.

In an implementation, the processor further implements the following when executing the computer programs. Before stacking the first material cage on the second material cage, the first material-cage image is obtained by photographing the first stacking apparatus in a first direction of the first material cage and the second stacking apparatus in the first direction of the second material cage, and the second material-cage image is obtained by photographing the first stacking apparatus in a second direction of the first material cage and the second stacking apparatus in the second direction of the second material cage with the image obtaining device, where the first direction is different from the second direction.

In an implementation, the processor further implements the following when executing the computer programs. Before stacking the first material cage on the second material cage, the first material-cage image is obtained by photographing a foot cup in the first direction of the first material cage and a pier in the first direction of the second material cage, and the second material-cage image is obtained by photographing a foot cup in the second direction of the first material cage and a pier in the second direction of the second material cage with the image obtaining device.

In an implementation, the processor further implements the following when executing the computer programs. The feature information of the material-cage image is obtained with the first detection model, and the first stacking apparatus of the first material cage and the second stacking apparatus of the second material cage are recognized according to the feature information.

In an implementation, the processor further implements the following when executing the computer programs. The first location information of the first foot cup in the first stacking apparatus and the second location information of the second pier in the second stacking apparatus are determined. A distance between the first foot cup and the second pier in each of stacking groups is obtained based on the first location information and the second location information, where the first foot cup and the second pier in a same stacking group are aligned with each other in a vertical direction when the first material cage is stacked on the second material cage. For each of the stacking groups, a comparing result of the stacking group is obtained by comparing the distance between the first foot cup and the second pier with a distance threshold. The first stacking result is determined based on the comparing results of the stacking groups.

In an implementation, the processor further implements the following when executing the computer programs. A material-cage image sample is obtained, where the material-cage image sample includes a first material-cage sample image of two material cages which can be stacked and a second material-cage sample image of two material cages which cannot be stacked. The second detection model is trained with the material-cage image sample and a label corresponding to the material-cage image sample and indicating whether two material cages can be stacked, to obtain a trained second detection model.

In an implementation, the processor further implements the following when executing the computer programs. Stacking data is obtained by weighting and summing the first stacking result and the second stacking result with a stacking determining model. Whether the first material cage can be stacked on the second material cage is determined by comparing the stacking data with a stacking threshold.

In one implementation, a non-volatile computer-readable storage medium is provided and configured to store computer programs which, when executed by a computer, enable the computer to execute the following. A material-cage image is obtained by photographing a first stacking apparatus of a first material cage and a second stacking apparatus of a second material cage. First target detection is performed on the material-cage image with a first detection model to recognize the first stacking apparatus of the first material cage and the second stacking apparatus of the second material cage. First location information of the first stacking apparatus and second location information of the second stacking apparatus are determined, and a first stacking result is determined based on the first location information and the second location information. Second target detection is performed on the material-cage image with a second detection model to extract feature information of the material-cage image, and obtain a second stacking result based on the feature information. Whether the first material cage can be stacked on the second material cage is determined, based on the first stacking result and the second stacking result.

In an implementation, the computer further implements the following when executing the computer programs. The first material-cage image is obtained by photographing the first stacking apparatus in a first direction of the first material cage and the second stacking apparatus in the first direction of the second material cage with the image obtaining apparatus, and the second material-cage image is obtained by photographing the first stacking apparatus in a second direction of the first material cage and the second stacking apparatus in the second direction of the second material cage with the image obtaining device, where the first direction is different from the second direction.

In an implementation, the computer further implements the following when executing the computer programs. The first material-cage image is obtained by photographing a foot cup in the first direction of the first material cage and a pier in the first direction of the second material cage with the image obtaining apparatus, and the second material-cage image is obtained by photographing a foot cup in the second direction of the first material cage and a pier in the second direction of the second material cage with the image obtaining device.

In an implementation, the computer further implements the following when executing the computer programs. The feature information of the material-cage image is obtained with the first detection model, and the first stacking apparatus of the first material cage and the second stacking apparatus of the second material cage are recognized according to the feature information.

In an implementation, the computer further implements the following when executing the computer programs. The first location information of the first foot cup in the first stacking apparatus and the second location information of the second pier in the second stacking apparatus are determined. A distance between the first foot cup and the second pier in each of stacking groups is obtained based on the first location information and the second location information, where the first foot cup and the second pier in a same stacking group are aligned with each other in a vertical direction when the first material cage is stacked on the second material cage. For each of the stacking groups, a comparing result of the stacking group is obtained by comparing the distance between the first foot cup and the second pier with a distance threshold. The first stacking result is determined based on the comparing results of the stacking groups.

In an implementation, the computer further implements the following when executing the computer programs. A material-cage image sample is obtained, where the material-cage image sample includes a first material-cage sample image of two material cages which can be stacked and a second material-cage sample image of two material cages which cannot be stacked. The second detection model is trained with the material-cage image sample and a label corresponding to the material-cage image sample and indicating whether two material cages can be stacked, to obtain a trained second detection model.

In an implementation, the computer further implements the following when executing the computer programs. Stacking data is obtained by weighting and summing the first stacking result and the second stacking result with a stacking determining model. Whether the first material cage can be stacked on the second material cage is determined by comparing the stacking data with a stacking threshold.

Those of ordinary skill in the art can understand that all or part of the processes in the methods of the above implementations can be implemented by instructing relevant hardware through a computer program. The computer program can be stored in a non-volatile computer-readable storage medium, the computer program, when executed, may include the processes of the above-mentioned method implementations. Any reference to memory, storage, data base or other media used in the various implementations provided in this disclosure may include at least one of a non-volatile memory or a volatile memory. The non-volatile memory may include a read-only memory (ROM), a magnetic tape, a floppy disk, a flash memory, an optical memory, or the like. The volatile memory may include a random access memory (RAM) or external cache memory. By way of illustration and not limitation, the RAM may be in various forms, such as a static random access memory (SRAM), a dynamic random access memory (DRAM), or the like.

The technical features of the above implementations can be combined arbitrarily. In order to make the description simple, all possible combinations of the technical features in the above implementations are not described. However, as long as there is no contradiction in the combination of these technical features, it is considered to be the range described in this specification.

The above-mentioned implementations only represent several implementations of the present disclosure, and the descriptions thereof are relatively specific and detailed, but should not be understood as a limitation on the scope of the invention patent. It should be noted that, for those ordinary skilled in the art, without departing from the concept of the present disclosure, several modifications and improvements can be made, which all belong to the protection scope of the present disclosure. Therefore, the scope of protection of the present disclosure patent shall be subject to the appended claims.

What is claimed is:

1. A method for determining material-cage stacking, comprising:

obtaining a material-cage image by photographing a first stacking apparatus of a first material cage and a second stacking apparatus of a second material cage;

performing first target detection on the material-cage image with a first detection model to recognize the first stacking apparatus of the first material cage and the second stacking apparatus of the second material cage;

determining first location information of the first stacking apparatus and second location information of the second stacking apparatus, and determining a first stacking result based on the first location information and the second location information;

performing second target detection on the material-cage image with a second detection model to extract feature information of the material-cage image, and obtaining a second stacking result based on the feature information; and determining whether the first material cage is able to be stacked on the second material cage, based on the first stacking result and the second stacking result;

wherein determining whether the first material cage is able to be stacked on the second material cage, based on the first stacking result and the second stacking result comprises:

obtaining stacking data by weighting and summing the first stacking result and the second stacking result with a stacking determining model; and determining whether the first material cage is able to be stacked on the second material cage by comparing the stacking data with a stacking threshold.

2. The method of claim 1, wherein the material-cage image comprises a first material-cage image and a second material-cage image; and obtaining the material-cage image by photographing the first stacking apparatus of the first material cage and the second stacking apparatus of the second material cage comprises:

obtaining the first material-cage image by photographing the first stacking apparatus in a first direction of the first material cage and the second stacking apparatus in the first direction of the second material cage; and obtaining the second material-cage image by photographing the first stacking apparatus in a second direction of the first material cage and the second stacking apparatus in the second direction of the second material cage, wherein the first direction is different from the second direction.

3. The method of claim 2, wherein the first stacking apparatus and the second stacking apparatus each comprise foot cups and piers matched with the foot cups;

obtaining the first material-cage image by photographing the first stacking apparatus in the first direction of the first material cage and the second stacking apparatus in the first direction of the second material cage comprises:

obtaining the first material-cage image by photographing a foot cup in the first direction of the first material cage and a pier in the first direction of the second material cage; and obtaining the second material-cage image by photographing the first stacking apparatus in the second direction of the first material cage and the second stacking apparatus in the second direction of the second material cage comprises:

obtaining the second material-cage image by photographing a foot cup in the second direction of the first material cage and a pier in the second direction of the second material cage.

4. The method of claim 3, wherein the first direction and the second direction are two sides of a warehousing unmanned forklift.

5. The method of claim 1, wherein performing the first target detection on the material-cage image with the first detection model to recognize the first stacking apparatus of the first material cage and the second stacking apparatus of the second material cage comprises:

obtaining the feature information of the material-cage image with the first detection model, and recognizing the first stacking apparatus of the first material cage and the second stacking apparatus of the second material cage according to the feature information.

6. The method of claim 1, wherein the first material cage has a first foot cup on a first surface of the first material cage and a first pier on a second surface of the first material cage, the second material cage has a second foot cup on a first surface of the second material cage and a second pier on a second surface of the second material cage, and wherein determining the first location information of the first stacking apparatus and the second location information of the second stacking apparatus, and determining the first stacking result based on the first location information and the second location information comprises:

determining the first location information of the first foot cup in the first stacking apparatus and the second location information of the second pier in the second stacking apparatus;

obtaining a distance between the first foot cup and the second pier in each of stacking groups based on the first location information and the second location information, wherein the first foot cup and the second pier in a same stacking group are aligned with each other in a vertical direction when the first material cage is stacked on the second material cage;

for each of the stacking groups, obtaining a comparing result of the stacking group by comparing the distance between the first foot cup and the second pier with a distance threshold; and determining the first stacking result based on the comparing results of the stacking groups.

7. The method of claim 6, wherein the first surface of the first material cage is a bottom surface of the first material cage, and the second surface of the first material cage is a top surface of the first material cage;

the first surface of the second material cage is a bottom surface of the second material cage, and the second surface of the second material cage is a top surface of the second material cage; and the bottom surface of the first material cage is close to or in contact with the top surface of the second material cage when the first material cage is stacked on the second material cage.

8. The method of claim 6, wherein determining the first location information of the first foot cup in the first stacking apparatus and the second location information of the second pier in the second stacking apparatus comprises:

assigning a midpoint of a rectangular frame defined by the first foot cup and the second pier as a positioning point of the first foot cup and the second pier; and obtaining the first location information and the second location information in real time according to internal and external parameters of an image obtaining device and an equation of ground in a coordinate system of the image obtaining device.

9. The method of claim 6, wherein determining the first stacking result based on the comparing results of the stacking groups comprises:

determining the first stacking result is that the first material cage is able to be stacked on the second material cage, on condition that the comparing results of the stacking groups each indicate that the first material cage is able to be stacked on the second material cage; or determining the first stacking result to be each of the comparing results of the stacking groups.

10. The method of claim 1, wherein before performing the second target detection on the material-cage image with the second detection model to extract the feature information of the material-cage image and obtaining the second stacking result based on the feature information, the method further comprises:

obtaining a material-cage image sample, wherein the material-cage image sample comprises a first material-cage sample image of two material cages being able to be stacked and a second material-cage sample image of two material cages being not able to be stacked; and training the second detection model with the material-cage image sample and a label corresponding to the material-cage image sample and indicating whether two material cages are able to be stacked, to obtain a trained second detection model.

11. The method of claim 1, wherein the stacking determining model is a trained classifier.

12. The method of claim 1, further comprising:

triggering operations of stacking the first material cage on the second material cage upon determining that the first material cage is able to be stacked on the second material cage; or triggering operations of preventing the first material cage from being stacked on the second material cage upon determining that the first material cage is not able to be stacked on the second material cage.

13. The method of claim 1, wherein the first location information is coordinate information of the first stacking apparatus, and the second location information is coordinate information of the second stacking apparatus.

14. A computer device, comprising:

a processor; and a memory configured to store computer instructions which, when executed by the processor, enable the processor to:

obtain a material-cage image by photographing a first stacking apparatus of a first material cage and a second stacking apparatus of a second material cage with an image obtaining device;

perform first target detection on the material-cage image with a first detection model to recognize the first stacking apparatus of the first material cage and the second stacking apparatus of the second material cage;

determine first location information of the first stacking apparatus and second location information of the second stacking apparatus, and determine a first stacking result based on the first location information and the second location information;

perform second target detection on the material-cage image with a second detection model to extract feature information of the material-cage image, and obtain a second stacking result based on the feature information;

obtain stacking data by weighting and summing the first stacking result and the second stacking result with a stacking determining model; and determine whether the first material cage is able to be stacked on the second material cage by comparing the stacking data with a stacking threshold.

15. The computer device of claim 14, wherein the material-cage image comprises a first material-cage image and a second material-cage image; and the processor configured to obtain the material-cage image is configured to:

obtain the first material-cage image by photographing the first stacking apparatus in a first direction of the first material cage and the second stacking apparatus in the first direction of the second material cage with the image obtaining device; and obtain the second material-cage image by photographing the first stacking apparatus in a second direction of the first material cage and the second stacking apparatus in the second direction of the second material cage with the image obtaining device, wherein the first direction is different from the second direction.

16. The computer device of claim 15, wherein the first stacking apparatus and the second stacking apparatus each comprise foot cups and piers matched with the foot cups;

the processor configured to obtain the first material-cage image is configured to:

obtain the first material-cage image by photographing a foot cup in the first direction of the first material cage and a pier in the first direction of the second material cage with the image obtaining device; and the processor configured to obtain the second material-cage image is configured to:

obtain the second material-cage image by photographing a foot cup in the second direction of the first material cage and a pier in the second direction of the second material cage with the image obtaining device.

17. The computer device of claim 14, wherein the processor configured to perform the first target detection is configured to:

obtain the feature information of the material-cage image with the first detection model, and recognize the first stacking apparatus of the first material cage and the second stacking apparatus of the second material cage according to the feature information.

18. The computer device of claim 14, wherein the first material cage has a first foot cup on a first surface of the first material cage and a first pier on a second surface of the first material cage, the second material cage has a second foot cup on a first surface of the second material cage and a second pier on a second surface of the second material cage, and wherein the processor configured to determine the first location information of the first stacking apparatus and the second location information of the second stacking apparatus, and determine the first stacking result based on the first location information and the second location information is configured to:

determine the first location information of the first foot cup in the first stacking apparatus and the second location information of the second pier in the second stacking apparatus;

obtain a distance between the first foot cup and the second pier in each of stacking groups based on the first location information and the second location information, wherein the first foot cup and the second pier in a same stacking group are aligned with each other in a vertical direction when the first material cage is stacked on the second material cage;

for each of the stacking groups, obtain a comparing result of the stacking group by comparing the distance between the first foot cup and the second pier with a distance threshold; and determine the first stacking result based on the comparing results of the stacking groups.

19. A non-volatile computer-readable storage medium configured to store computer programs which, when executed by a computer, enable the computer to:

obtain a material-cage image by photographing a first stacking apparatus of a first material cage and a second stacking apparatus of a second material cage;

perform first target detection on the material-cage image with a first detection model to recognize the first stacking apparatus of the first material cage and the second stacking apparatus of the second material cage;

determine first location information of the first stacking apparatus and second location information of the second stacking apparatus, and determine a first stacking result based on the first location information and the second location information;

perform second target detection on the material-cage image with a second detection model to extract feature information of the material-cage image, and obtain a second stacking result based on feature information;

obtain stacking data by weighting and summing the first stacking result and the second stacking result with a stacking determining model; and determine whether the first material cage is able to be stacked on the second material cage by comparing the stacking data with a stacking threshold.

20. The method of claim 1, wherein the first detection model is Yolov5 model deployed through OpenVINO.

* * * * *